United States Patent Office 3,285,896
Patented Nov. 15, 1966

3,285,896
POLYMERIZATION OF VINYL ETHERS
James C. MacKenzie, Wellesley Hills, and Adam Orzechowski, Waltham, Mass., assignors to Cabot Corporation, Boston, Mass., a corporation of Delaware
No Drawing. Filed Sept. 4, 1962, Ser. No. 221,312
The portion of the term of the patent subsequent to January 18, 1982, has been disclaimed
19 Claims. (Cl. 260—91.1)

This invention relates to the polymerization and copolymerization of vinyl ethers, such as vinyl isobutyl ether, vinyl ethyl ether, vinyl 2-ethylhexyl ether, and vinyl 2-chloroethyl ether.

Accordingly, it is a principal object of the present invention to provide a novel process for polymerizing vinyl ethers and mixtures thereof.

Other objects of the present invention will in part be obvious and will in part appear hereinafter.

In accordance with the present invention, vinyl ethers are polymerized and/or copolymerized by catalysts comprising (a) the product of the reaction carried out under certain conditions between a halide-type compound of a metal of Group IVa, Va, or VIa and hydroxyl groups on the surface of a finely divided particulate inorganic solid, and (b) an organometallic compound. The polymerization or copolymerization reaction can be effected at suitable temperatures within the range of from about −80° C. to about 190° C., and pressure ranging from below atmospheric upwardly to any desired maximum pressure.

Inorganic solids suitable for the purposes of the present invention generally include any inorganic compound which is available in finely divided particulate form with hydroxyl groups on the surface thereof. For example, oxides such as alumina, zirconia, and silica, carbon blacks such as channel black and furnace black, and aluminates such as corundum are all generally suitable for the purposes of the present invention. In particular, inorganic solids having an average particle diameter of less than about 0.1 micron and having at least about $1 \times 10^{-4}$ equivalents per gram of hydroxyl groups chemically bound to the surface thereof, as set forth in more detail in U.S. application Serial No. 2,861, filed January 18, 1960, now abandoned, are preferred in accordance with the present invention.

Halide-type compounds of Groups IVa, Va and VIa (hereinafter generally referred to as transition metal halides) suitable for the purposes of the present invention are the compounds conforming to the empirical formula:

$$TO_aX_b$$

wherein T is a metal of Groups IVa, Va or VIa (where the Group numbers correspond to the Mendeleev Periodic System); O is oxygen, $a$ equals 0, 1 or 2; each X is any halogen; and $b$ is an integer from 1 to 6.

Examples of suitable compounds conforming to said empirical formula are halides such as zirconium tetrachloride, vanadium tetrachloride and titanium tetraiodide, and oxyhalides such as chromium oxychloride and vanadium oxychloride.

The conditions under which reaction between the transition metal halide and the finely divided inorganic solid can be accomplished are subject to considerable variation. However, in order to obtain a catalyst component with exceptionally high activity and reproducible character and performance, it has been found to be all important that the finely divided inorganic solid be essentially dry and anhydrous (i.e. free of molecular water in any form) at the time it is brought into contact with the transition metal halide. In addition, it is recommended that the reaction of the inorganic solid and the transition metal halide be accomplished so as to allow by-products of the reaction to be eliminated from the reaction zone in order to thereby insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture and the rate of removal of the gaseous by-products. Generally speaking, almost any temperature between about 0° C. and 300° C. and even higher temperatures can be used satisfactorily, but room temperature to about 105° C. is generally definitely preferred. Assuming provision is made for intimate contact of the dry inorganic solid and the transistion metal halide, the minimum time required to accomplish the chemical reaction will vary from about 1 hour at room temperature to about 15 minutes at temperatures of 100° C. or over. Temperatures substantially higher than about 300° C., e.g. 500° C., are completely needless and therefore of little or no interest.

Elimination of by-products of the reaction from the reaction zone, i.e. from the reaction medium, can be accomplished in any convenient manner such as, by sweeping the reaction vessel with an inert gas, by carrying out the reaction at sufficiently elevated temperatures while stirring to drive off by-products, and by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

Organometallic compounds suitable for the purposes of the present invention are the compounds chosen from the group consisting of:

(a) Compounds conforming to the empirical formula

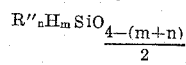

wherein each R″ is chosen from the group consisting of monovalent hydrocarbon radicals, monovalent alkoxy radicals, monovalent aryloxy radicals and the halogens; $n$ is 0, 1, 2 or 3; each H is a hydride radical; $m$ is 1, 2, 3 or 4; Si is silicon; and O is oxygen; and (b) $$MM'_vX_nR_y$$

wherein M is a metal chosen from Groups I, II or III of the periodic table; M′ is a metal of Group I of the periodic table; $v$ equals 0 or 1; each X is a halogen; $n$ equals 0, 1, 2 or 3; each R is any monovalent hydrocarbon or hydrogen radical; and $y$ equals 1, 2, 3 or 4.

Specific examples of compounds conforming to the empirical formula

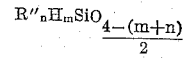

which are suitable for the purposes of the present invention are silane—$SiH_4$;
triethylsilane—$HSi(C_2H_5)_3$;
trimethoxysilane—$HSi(OCH_3)_3$;
dibenzylsilane—$H_2Si(C_6H_5CH_2)_2$;
triphenoxysilane—$HSi(OC_6H_5)_3$;
dicyclohexylphenylsilane—$HSiC_6H_5(C_6H_{11})_2$;
cyclohexylmethoxysilane—$H_2Si(C_6H_{11})OCH_3$;
monochlorosilane—$H_3SiCl$;

diethoxymonochlorosilane—HSiCl(OC$_2$H$_5$)$_2$;
methylmonobromosilane—H$_2$SiBrCH$_3$;
tri-n-propylsilane—HSi(n-C$_3$H$_7$)$_3$;
methyldiethylsilane—HSi(C$_2$H$_5$)$_2$CH$_3$;
cyclic alkyl hydrogen silicones such as (CH$_3$HSiO)$_3$ and (CH$_3$HSiO)$_6$; and
linear alkyl hydrogen silicones such as
(CH$_3$)$_2$HSiOSiH(CH$_3$)$_2$ and
(CH$_3$)$_2$HSiOSiH(CH$_3$)OSiH(CH$_3$)$_2$.

Organometallic compounds of a single Group I, II or III metal which conform to the formula $$MM'_vX_nR_y$$

and which are suitable for the practice of the invention include compounds conforming to the subgeneric formula:

$$M(R)_k$$

wherein M is a Group I, II or III metal, such as sodium, beryllium, boron, aluminum and gallium; wherein $k$ equals 1, 2 or 3 depending upon the valency of M; and wherein each R may be hydrogen or any monovalent hydrocarbon radical. Examples of suitable hydrocarbon radicals include aryl or alkaryl radicals, aliphatic hydrocarbon radicals, or derivatives, such as alkyl cycloalkenylalkyl, arylalkyl, alkylcycloalkyl and cycloalkylalkenyl.

Specific examples of R groups for substitution in the above formula include methyl, isobutyl, hexyl, n-dodecyl, 2-methyl-2-butenyl, 4-cyclohexylethyl, 2-phenylpropyl, methylnaphthylethyl, 2,2,1-vicycloheptyl, dimethylcyclohexyl, 5-cyclopentadienyl, phenylcyclohexyl, tolyl, xylyl, xenyl, and dimethylnaphthyl.

Specific compounds conforming to the empirical formula $$MM'_vX_nR_y$$

and which are therefore suitable for the purposes of the present invention are organo compounds such as butyllithium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodiumdiphenyllithium.

Further specific examples of suitable organometallic compounds may be found in the copending U.S. application, Serial No. 2,861, filed January 18, 1960, now abandoned.

Although it is appreciated that when R or R″ in the above empirical formulae do not comprise at least one hydrocarbon radical, the resulting compounds cannot normally be termed organometallic compounds, compounds lacking at least one hydrocarbon radical comprise such a relatively small number of the total number of compounds included by said general formulae that for the purposes of the present invention, it is intended that these compounds be included within the generic term, organometallic compound. Accordingly, in the specification and in the claims, it is intended, and therefore, it should be understood, that the term, organometallic compound, refers to all the compounds included within the scope of the above defined general formulae. In addition, it is pointed out that while, strictly speaking, silicon is not a metal, it is intended, and therefore it should be understood, that for the purposes of the present specification and claims, silicon is a metal and the term organometallic includes within its scope, silicon compounds within the scope of the formula $$R''_nH_mSiO_{\frac{4-(m+n)}{2}}$$

In addition, it is pointed out that when a silane compound is to be utilized in forming the catalyst, it is generally necessary to heat the cocatalyst-silane mixture to temperatures above about 100° C. and preferably above about 140° C. in order to activate the catalyst.

Vinyl ethers suitable for the purposes of the present invention are those conforming to the formula:

$$\begin{array}{c}CH_2=C-O-R''' \\ | \\ R'\end{array}$$

wherein R′ is chosen from the group consisting of hydrogen, the halogens, and any hydrocarbon radical having a length of one to eighteen carbon atoms, and R‴ is any hydrocarbon radical having a length of one to eighteen carbon atoms.

Specific examples of vinyl ethers suitable for the purposes of the present invention are vinyl methyl ether, vinyl isobutyl ether, vinyl 2-methoxyethyl ether, vinyl isopropyl ether, vinyl phenyl ether, vinyl octadecyl ether and vinyl p-butylcyclohexyl ether.

Using the catalysts of this invention, polymerization of the vinyl ethers can be accomplished in the absence of liquids (other than the monomers themselves) solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also members of the aromatic hydrocarbon series, such as isopropyl benzene, ethyltoluene, hemimellitene, pseudocumene, isodurene, isoamylbenzene, and particularly the mononuclear aromatic hydrocarbons such as xylenes, mesitylene and xylene-p-cymene mixtures, and the like are completely suitable.

The proportion of surface reacted particulate inorganic solid to organometallic compound utilized in preparing the catalyst is not usually a critical feature of the process. We have found from experience that a molar ratio of from 0.1 to 5 millimoles of the organometallic compound per atom of transition metal chemically combined with the surface of the finely divided solid is to be preferred.

The quantity of catalyst, i.e. comprising both the surface reacted finely divided solid and the organometallic compound, to be utilized in the polymerization reaction may vary, but in general, the total quantity of catalyst that need be employed based on the weight of the charging stock is very small particularly when a very fine particle size oxide is utilized as the inorganic solid.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

*Example 1*

To a 2,000 milliliter three neck, glass reaction vessel there is added 20 grams of "CAB-O-SIL," a pyrogenic silica produced by Cabot Corporation, which has an average particle diameter of 10 millimicrons and a hydroxyl group content on the surface thereof of about 1.5 milliequivalents per gram. Said reaction vessel is then placed in a vacuum drying oven heated to a temperature of about 100° C., for about twelve hours. Subsequently, the vessel is sealed without exposing silica to the atmosphere and there are charged to said vessel 20 millimoles of vanadium oxychloride and 1,500 milliliters of isooctane. The vessel is then continuously stirred, and maintained at a temperature of about 100° C. for a period of 6 hours while the contents thereof are swept by a stream of dry $N_2$. Subsequently the extent of the reaction between the vanadium oxychloride and the silica is determined by measuring the quantity of HCl removed from the vessel by the nitrogen stream, and by testing the liquid contents of the vessel for the absence therein of vanadium oxychloride and the said silica is found to have 20 milliatoms of vanadium on the surface thereof. 150 milliliters of this slurry containing about 2 milliatoms of vanadium bound to the surface of about 2 grams of silica, is then transferred from this reaction vessel to a 1,000 ml. reaction vessel which has been previously flushed with dry nitrogen. Next, 3 millimoles of triisobutyl aluminum is added to the bottle followed by about 800 millimoles of vinyl isopropyl ether monomer. The bottle is then continuously agitated at ambient temperatures for about 24 hours. The reaction products are analyzed and it is found that about 58 grams of solid vinyl isopropyl ether polymer has been produced.

*Example 2*

To a 250 milliliter reaction vessel, there is added 25 milliliters of the catalyst slurry produced in Example 1 which contains about 1 milliatom of vanadium bound to the surface of about 1 gram of silica. Next, 100 millimoles of vinyl ethyl ether monomer followed by 1 millimole of aluminum triethyl is added to the vessel. The vessel is then continuously agitated at ambient temperatures for 20 hours. The reaction products are analyzed and it is found that solid vinyl ethyl ether polymer has been produced.

*Example 3*

To a 250 milliliter reaction vessel which has been previously flushed with dry nitrogen, there is added 1 millimole of vanadium oxychloride, 1 millimole of aluminum triethyl, and 100 millimoles of vinyl ethyl ether monomer. The vessel is then continuously agitated at ambient temperatures for 20 hours. The reaction products are analyzed and it is found that solid vinyl ethyl ether polymer has been produced. The polymer product of this example, however, is found to be far more soluble in methyl alcohol than that of Example 2.

*Example 4*

To a 2,000 milliliter, three neck, glass reaction vessel equipped with a stirrer, a condenser and nitrogen inlet and outlet tubes, there is added 20 grams of "Supercarbovar," a channel carbon black produced by Cabot Corporation, which has an average particle diameter of about 14 millimicrons and a hydroxyl group content on the surface thereof of about 1.6 milliequivalents per gram. To said reaction vessel there is added 1,800 milliliters of benzene and the resulting slurry is dried by being maintained at the boiling point of benzene, i.e. about 80° C., for about 24 hours while a water/benzene azeotrope is removed from the reaction vessel by periodic distillation until about 600 milliliters of distillate has been removed. The vessel is then cooled and charged with 20 millimoles of titanium tetrachloride. The resulting slurry is then refluxed for 8 hours with continuous stirring while the HCl produced is removed by a stream of dry nitrogen. Subsequently, the extent of the reaction between the titanium tetrachloride and the hydroxyl groups on the carbon black is determined by measuring the quantity of HCl that was produced and by testing the liquid contents of the vessel for the absence therein of titanium tetrachloride, and the said carbon black is found to have 20 milliatoms of titanium chemically bound to the surface thereof. A sample of 60 milliliters of this slurry containing about 1 milliatom of titanium bound to the surface of about 1 gram of carbon black, is then transferred from this reaction vessel to a one liter autoclave which has been previously flushed with dry nitrogen. Next, 2 millimoles of diethylsilane are added to the autoclave and the autoclave is then continuously agitated and heated to, and maintained at, about 150° C. for about 4 hours. Subsequently, the reaction vessel is cooled to, and maintained at, 80° C. followed by the introduction of 200 millimoles of vinyl 2-methoxyethyl ether monomer. The autoclave is then pressurized to 1,400 p.s.i. with helium and the contents therein continuously agitated for three hours. The reaction products are analyzed and it is found that solid vinyl 2-methoxyethyl ether polymer has been produced.

*Example 5*

To a 1,000 milliliter, three neck, glass reaction vessel there is added 5.3 grams of "Alon," a pyrogenic alumina produced by Deutsche Gold-und Silber-Scheideanstalt vormals Roessler which has an average particle diameter of about 10–40 millimicrons and a hydroxyl group content on the surface thereof of about 0.7 milliequivalent per gram. Said reaction vessel is then placed in a vacuum drying oven heated to a temperature of about 110° C. for about fifteen hours. Subsequently, the vessel is sealed without exposing said alumina to the atmosphere and there are charged to said vessel 2.5 millimoles of tantalum pentabromide in 500 milliliters of isooctane. The vessel is then continuously stirred, and maintained at a temperature of about 99° C. for a period of about 10 hours while the contents of the gas phase are swept by a stream of dry $N_2$. Subsequently, the extent of the reaction between the tantalum pentabromide and the alumina is determined by measuring the quantity of HBr removed from the vessel by the nitrogen stream, and by testing the liquid contents of the vessel for the absence therein of tantalum pentabromide and the said alumina is found to have 2.5 milliatoms of tantalum reacted on the surface thereof. 125 milliliters of this slurry containing about 0.6 milliatom of tantalum bound to the surface of about 1.3 grams of alumina, is then transferred from this reaction vessel to a 500 ml. vessel which has been previously flushed with dry nitrogen. Next, 2.5 millimoles of butyl lithium is added to the said second vessel followed by 300 millimoles of vinyl 2-chloroethyl ether monomer. The contents of said second vessel are then continuously agitated at ambient temperatures for about 24 hours. The reaction products are analyzed and it is found that solid vinyl 2-chloroethyl ether polymer has been produced.

*Example 6*

To a 2,000 milliliter, three neck, glass reaction vessel there is added 20 grams of "Hi-Sil-X-303," a precipitated silica produced by Columbia Southern Chemical Corporation and which has an average particle diameter of about 23 millimicrons and a hydroxyl group content on the surface thereof of about 1.3 milliequivalents per gram. Said reaction vessel is then placed in a vacuum drying oven heated to a temperature of about 100° C. for about 12 hours. Subsequently, the vessel is sealed without exposing said silica to the atmosphere and there is charged to said vessel 16 millimoles of zirconium tetrachloride and 1,200 milliliters of toluene. The vessel is then continuously agitated and heated to, and maintained at a temperature of about 100° C. for a period of 24 hours while the contents of the gas phase are swept by a stream of dry $N_2$. Subsequently, the extent of the reaction between the zirconium tetrachloride and the silica is determined by measuring the quantity of HCl removed from the vessel by the nitrogen stream, and by testing the liquid contents of the vessel for the absence therein of zirconium tetrachloride, and the said silica is found to have 16 millimoles of zirconium chemically bound to the surface thereof. 1 gram of this silica containing about 0.8 millimole of zirconium chemically bound to the surface thereof, and suspended in about 60 milliliters of toluene is then transferred without exposure to the atmosphere from this reaction vessel to a 500 milliliter, three neck, glass reaction vessel which has been previously flushed with dry nitrogen. 80 milliliters of toluene, 3.0 grams of vinyl isobutyl ether and 5.4 grams of vinyl decyl ether are then charged to this vessel. Next, 1.6 millimoles of triethyl aluminum is added, and the contents of said reaction vessel are continuously and vigorously stirred for about 23 hours. The reaction products are analyzed and it is found that a solid vinyl isobutyl ether-vinyldecyl ether copolymer has been produced.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polymers.

Obviously many changes may be made in the above described examples and procedure without departing from the scope of the invention. For example, although only transition metal chlorides and bromides are mentioned in the above examples, transition metal iodides and fluorides are also suitable for the purposes of the present invention. For example, titanium tetrafluoride is entirely suitable.

Also pyrogenically coformed, or coprecipitated metal oxides, or metal oxides coformed with, or mixed with, other compounds are suitable for the purposes of the present invention. It is pointed out that it is intended and accordingly it should be so understood that for the purposes of the present specification and the claims appended thereto, the term, metal oxide, includes silica.

Accordingly, it is intended that the above disclosure be regarded as illustrative and as in no way limiting the scope of the invention.

What we claim is:

1. A process for polymerizing vinyl ethers and mixtures thereof which comprises contacting at temperatures between about −80° C. and 190° C., a substance conforming to the formula

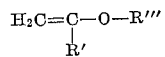

wherein R′ is chosen from the group consisting of hydrogen, halogens, and any hydrocarbon radical having a length of one to eighteen carbon atoms, and R′′′ is any hydrocarbon radical having a length of one to eighteen carbon atoms, with a catalyst comprising:

(a) a finely divided inorganic solid having an average particle diameter of less than about 0.1 micron and carrying in chemical combination on the surface thereof at least about $1 \times 10^{-4}$ equivalents per gram of structures conforming to the formula:

$$TO_aX_b$$

where T is a metal chosen from the group consisting of the metals of Groups IVa, Va, and VIa (Mendeleev Periodic System); O is oxygen; a is a number from 0 to 2; each X is a halogen; b is a number from 1 to 5; and where said structures are chemically linked directly from T to at least one oxygen atom in the surface of said solid and (b) an organometallic compound chosen from the group consisting of compounds conforming to the empirical formula

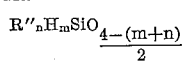

wherein each R″ is chosen from the group consisting of monovalent hydrocarbon radicals, monovalent alkoxy radicals, monovalent aryloxy radicals and the halogens; n is a number from 0 to 3; each H is a hydride radical; m is a number from 0 to 4; Si is silicon; and O is oxygen; and compounds conforming to the empirical formula $$MM'_vX_nR_y$$

wherein M is chosen from the group consisting of the metals of Groups I, II and III; M′ is a metal of Group I; v is a number from 0 to 1; each X is any halogen; n is a number from 0 to 3; each R is chosen from the group consisting of any monovalent hydrocarbon radical and hydrogen; and y is an integer from 1 to 4.

2. The process of claim 1 wherein each X in the formulae $$TO_aX_b$$

and $$MM'_vX_nR_{y-n}$$

is chlorine.

3. The process of claim 1 wherein said compound conforming to the formula $$TO_aX_b$$

is a compound of a metal of Group IVa.

4. The process of claim 1 wherein said compound conforming to the formula $$TO_aX_b$$

is zirconium tetrachloride.

5. The process of claim 1 wherein said compound conforming to the formula $$TO_aX_b$$

is a compound of titanium.

6. The process of claim 1 wherein said compound conforming to the formula $$TO_aX_b$$

is a compound of a metal of Group Va.

7. The process of claim 1 wherein said compound conforming to the formula $$TO_aX_b$$

is vanadium oxychloride.

8. The process of claim 1 wherein said compound conforming to the formula $$TO_aX_b$$

is a compound of a metal of Group VIa.

9. The process of claim 1 wherein R′ in the formula

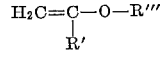

is hydrogen.

10. The process of claim 1 wherein R′ in the formula

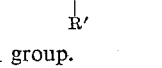

consists of a methyl group.

11. The process of claim 1 wherein the substance conforming to the formula

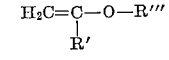

is vinyl isobutyl ether.

12. The process of claim 1 wherein the substance conforming to the formula

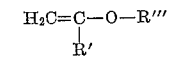

is vinyl methyl ether.

13. The process of claim 1 wherein the substance conforming to the formula

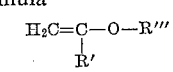

is vinyl β-decalyl ether.

14. The process of claim 1 wherein said organometallic compound is an aluminum alkyl.

15. The process of claim 1 wherein said organometallic compound is a silane.

16. The process of claim 1 wherein said organometallic compound is a trialkylsilane.

17. The process of claim 1 wherein said organometallic compound is a chlorosilane.

18. A process for polymerizing vinyl ethers and mixtures thereof, which comprises contacting at temperatures between about −80° C. and about 190° C., a substance conforming to the formula $$H_2C=C-O-R'''$$
$$|$$
$$R'$$

wherein R′ is chosen from the group consisting of hydrogen, halogens and any hydrocarbon radical having a length of one to eighteen carbon atoms, and R‴ is any hydrocarbon radical having a length of one to eighteen carbon atoms, with a catalyst comprising:

(1) the product of the reaction, accomplished at temperatures between about 0° C. and about 300° C., for a minimum period ranging from about 10 hours to 15 minutes, the higher the temperature used, the shorter being the minimum time required, of (a) a compound conforming to the formula:

$$TO_aX_b$$

where T is chosen from the group consisting of the metals of Groups IV*a* (Mendeleev Periodic System), V*a* and VI*a*; O is oxygen; *a* is a number from 0 to 2; each X is any halogen; and *b* is an integer from 1 to 7; and (b) hydroxyl groups in the surface of a particulate finely divided inorganic solid having an average particle diameter of less than about 0.1 micron and having at least about $1\times10^{-4}$ equivalents per gram of hydroxyl groups chemically bound to the surface thereof, and (2) an organometallic compound chosen from the group consisting of compounds conforming to the empirical formula $$R''_nH_mSiO_{\frac{4-(m+n)}{2}}$$

wherein each R″ is chosen from the group consisting of monovalent hydrocarbon radicals, monovalent alkoxy radicals, monovalent aryloxy radicals and the halogens; *n* is a number from 0 to 3; each H is a hydride radical; *m* is a number from 1 to 4; Si is silicon; and O is oxygen; and compounds conforming to the empirical formula $$MM'_vX_nR_y$$

wherein M is chosen from the group consisting of the metals of Groups I, II and III; M′ is a metal of Group I; *v* is a number from 0 to 1; each X is any halogen; *n* is a number from 0 to 3; each R is chosen from the group consisting of any monovalent hydrocarbon radical and hydrogen; and *y* is an integer from 1 to 4.

19. The process of claim 18 wherein the reaction between the compound conforming to the formula $$TO_aX_b$$

and hydroxyl groups in the surface of particulate finely divided inorganic solid is accomplished at temperatures between about 25° C. and about 105° C. for a minimum period ranging from about 1 hours at about 105° C. to about 15 minutes at about 25° C.

References Cited by the Examiner
UNITED STATES PATENTS

| | | | |
|---|---|---|---|
| 2,932,633 | 4/1960 | Juviland et al. | 260—94.9 |
| 2,981,725 | 4/1961 | Luft et al. | 260—93.7 |
| 3,065,220 | 11/1962 | McManimie et al. | 260—91.1 |
| 3,163,611 | 12/1964 | Andersen | 260—91.1 |
| 3,166,542 | 1/1965 | Orzechowski | 260—94.9 |
| 3,166,544 | 1/1965 | Orzechowski | 260—94.9 |

JOSEPH L. SCHOFER, *Primary Examiner.*

WILLIAM H. SHORT, *Examiner.*

W. G. GOODSON, M. B. KURTZMAN,
                                        *Assistant Examiners.*